UNITED STATES PATENT OFFICE.

HAROLD A. MORTON, OF PITTSBURGH, PENNSYLVANIA, ASSIGNOR TO UNION CARBIDE COMPANY, OF NEW YORK, N. Y., A CORPORATION OF VIRGINIA.

METHOD OF REGENERATING MERCURY CATALYSTS.

1,293,863. Specification of Letters Patent. Patented Feb. 11, 1919.

No Drawing. Application filed April 9, 1918. Serial No. 227,532.

*To all whom it may concern:*

Be it known that I, HAROLD A. MORTON, a citizen of the United States, residing at Pittsburgh, in the county of Allegheny and State of Pennsylvania, have invented certain new and useful Improvements in Methods of Regenerating Mercury Catalysts, of which the following is a specification.

This invention is a method of regenerating exhausted mercury catalysts, in which term I include catalytic salts or compounds of mercury, as the sulfate, oxid, etc.

It is well known that in certain chemical manufacturing operations, such for example as the preparation of acetaldehyde by introducing acetylene into an acid solution containing a salt of mercury, the latter undergoes gradual reduction and ultimately becomes ineffective as a catalyst. The reduction to metallic mercury is not however complete, the reduced product being a mercury-bearing sludge which is very difficult of regeneration. In the case of acetaldehyde manufacture above referred to, this sludge is a gray or black sediment which has been found to consist essentially of a mixture of finely divided mercury, oxids of mercury, and organic mercury compounds.

I have discovered that such mercury-bearing sludges may be readily regenerated by a method which involves as an initial step the treatment of the sludge, previously separated from the medium in which the reaction was carried out and preferably suspended in water, with free chlorin or substances capable of generating chlorin. The mercury is thereby converted into mercuric chlorid which is readily transformed by known methods into the desired catalyst, usually the sulfate or oxid.

In the practice of my invention in its preferred embodiment, the recovered sludge is suspended in water, and the chlorin gas is introduced while the mixture is being vigorously agitated. The chlorin not only chlorinates the mercury but converts it into the mercuric state. The primary advantage of this method is that the mercury is completely transformed into a water-soluble mercuric salt ($HgCl_2$), whereas the organic material is left in a water-insoluble condition, thus rendering possible a very complete separation and yielding directly a pure mercury salt. The salt thus obtained, when transformed to the original catalyst, has proven to be highly active for the acetaldehyde reaction.

Following is a specific example of a preferred method in accordance with my invention, it being understood that the invention is not restricted to the particular conditions therein set forth.

*Example.*

One kilogram of mercury sludge resulting from the production of acetaldehyde from acetylene is carefully washed with hot water to remove the soluble impurities. This washed sludge is suspended by means of an appropriate stirring device in an approximately equal quantity of water, and chlorin gas is introduced. With vigorous agitation the chlorin is absorbed rapidly, while the mixture becomes perceptibly warmer owing to the exothermic reaction. The whole operation may be carried out at normal or higher temperatures. When the mixture has become saturated with chlorin the absorption ceases: at this point the mercury sludge has absorbed approximately 400 grams of chlorin. The mixture is now filtered and washed. The clear solution thus obtained contains the mercuric salt substantially free from impurities, while the residue, amounting to about 170 grams, is free from mercury. The solution containing the mercury salt may now be treated in accordance with the well known methods for the regeneration of the desired catalyst; for example mercuric sulfate may be prepared by evaporating the solution with equivalent quantity of sulfuric acid, or mercuric oxid may be made by precipitation with alkali hydroxids.

Substances capable of generating chlorin are obviously to be regarded as equivalents of free chlorin for the purposes of this invention.

I claim—

1. A method of regenerating mercury catalysts, comprising subjecting the exhausted catalyst to the action of chlorin to convert the mercury content thereof into mercuric chlorid, recovering the mercuric chlorid from the resulting mixture, and converting the same into the desired catalyst.

2. A method of regenerating mercury catalysts, comprising subjecting the exhausted catalyst in water suspension to the action of chlorin to convert the mercury content thereof into mercuric chlorid, recovering the mercuric chlorid from the resulting mixture, and converting the same into the desired catalyst.

In testimony whereof, I affix my signature.

HAROLD A. MORTON.